US011210862B1

(12) United States Patent
Ciereszko et al.

(10) Patent No.: US 11,210,862 B1
(45) Date of Patent: Dec. 28, 2021

(54) DATA SELECTION FOR SPATIAL RECONSTRUCTION

(71) Applicant: Microsoft Technology Licensing, LLC, Redmond, WA (US)

(72) Inventors: Jacek Ciereszko, Bellevue, WA (US); Gregory Bishop Bahm, Kirkland, WA (US); Cedric Khanntipo Ith, Seattle, WA (US); Xonatia Ravelle Lee, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/911,554

(22) Filed: Jun. 25, 2020

(51) Int. Cl.
  *G06T 19/00* (2011.01)
  *G06T 7/73* (2017.01)
  *G06T 15/06* (2011.01)

(52) U.S. Cl.
  CPC .............. *G06T 19/006* (2013.01); *G06T 7/73* (2017.01); *G06T 15/06* (2013.01)

(58) Field of Classification Search
  None
  See application file for complete search history.

(56) References Cited

U.S. PATENT DOCUMENTS

| 9,373,190 | B2 | 6/2016 | Wei et al. |
| 9,811,733 | B2* | 11/2017 | Leung ........................ G06T 7/55 |
| 10,491,887 | B2 | 11/2019 | Haimovitch-yogev et al. |
| 10,643,394 | B2 | 5/2020 | Chen et al. |
| 2010/0226592 | A1* | 9/2010 | Ferguson ............. H04N 17/004 382/294 |
| 2018/0203086 | A1* | 7/2018 | Rehwald ............ G01R 33/4818 |
| 2018/0234669 | A1* | 8/2018 | Chen .................... H04N 13/221 |
| 2019/0197709 | A1* | 6/2019 | Windmark ................ G06T 7/80 |
| 2019/0197765 | A1* | 6/2019 | Molyneaux .......... G02B 27/017 |
| 2019/0197786 | A1 | 6/2019 | Molyneaux et al. |
| 2020/0051267 | A1 | 2/2020 | Knorr et al. |

OTHER PUBLICATIONS

"Application as Filed in U.S. Appl. No. 16/355,264", filed Mar. 15, 2019, 36 Pages.
"Scanning and Detecting 3D Objects", Retrieved from: https://web.archive.org/web/20180620004941/https://developer.apple.com/documentation/arkit/scanning_and_detecting_3d_objects, Jun. 20, 2018, 10 pages.

(Continued)

*Primary Examiner* — Martin Mushambo
(74) *Attorney, Agent, or Firm* — Holzer Patel Drennan (57) ABSTRACT

A computing device spatially reconstructs a virtual feature surface in a mixed reality environment. The computing device detects addition of a raycast element to a virtual user space, maps multiple feature points detected from multiple video frames of a physical user space into a virtual user space, selecting at least three feature points from the multiple feature points that satisfy selection criteria applied in the virtual user space along a raycast axis of the raycast element in the virtual user space, and defines the virtual feature surface in the virtual user space using the at least three selected feature points. At least two of the at least three feature points are detected in different video frames.

20 Claims, 9 Drawing Sheets

(56) References Cited

OTHER PUBLICATIONS

Agrawal, Vardhan, "Augmented Reality with ARKit: Feature Points and Horizontal Plane Detection", Retrieved from: https://code.tutsplus.com/tutorials/augmented-reality-with-arkit-feature-points-and-horizontal-plane-detection-cms-30839, May 28, 2018, 23 Pages.
Han, et al., "Image-Based 3D Object Reconstruction: State-of-the-Art and Trends in the Deep Learning Era", In Journal of Computing Research Repository, Jun. 15, 2019, pp. 1-28.
Lourakis, et al., "Accurate Scale Factor Estimation in 3D Reconstruction", In International Conference on Computer Analysis of Images and Patterns, Aug. 27, 2013, pp. 498-506.

* cited by examiner

DATA SELECTION FOR SPATIAL RECONSTRUCTION

BACKGROUND

A mixed reality environment provides a combination of physical elements and virtual elements to present visualizations and experiences in a visual user space that is within the field of view of a user. Physical elements exist in a physical user space, such as the room in which the user is standing and other objects in the room. In contrast, virtual elements are digitally-generated elements in a virtual user space that can be presented to the user in some combination with the physical elements within the visual user space. In some mixed reality environments, virtual elements overlay (and/or "underlay") physical elements in the user's field of view with spatial registration that enables geometric persistence relating to placement and orientation within the real world.

In some applications, the user can wear a transparent or translucent display or set of displays through which the user can see the physical elements in his or her physical space and on which the user can see displayed renderings of virtual elements. In other applications, the physical elements can be captured (e.g., by a forward-facing camera) and rendered in the displays along with the virtual elements. The physical and virtual elements appear, in many cases, to be combined in the display(s) as part of the same immersive visual reality. In other implementations, for example, mobile devices, such as a camera-equipped mobile phone or tablet computer, can display physical elements and virtual elements in the display and receive user input through a touch screen, microphones, and other sensors.

Some mixed reality environments allow a user to place virtual elements (e.g., arrows, text, other graphics) (referred to as an "annotation") with respect to physical elements in the visual user space. However, as the visual user space shifts (e.g., as the user's head turns, as a mobile phone position changes), some physical element data can be lost or corrupted or become less accurate or reliable. Accordingly, the spatial registration between virtual elements and physical elements can degrade or be lost. This loss of spatial registration can cause a decrease in the user experience as virtual elements lose their positioning relative to the physical elements.

SUMMARY

The described technology provides a computing device that spatially reconstructs a virtual feature surface in a mixed reality environment. The computing device detects addition of a raycast element to a virtual user space, maps multiple feature points detected from multiple video frames of a physical user space into a virtual user space, selecting at least three feature points from the multiple feature points that satisfy selection criteria applied in the virtual user space along a raycast axis of the raycast element in the virtual user space, and defines the virtual feature surface in the virtual user space using the at least three selected feature points. At least two of the at least three feature points are detected in different video frames This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Figure 1:
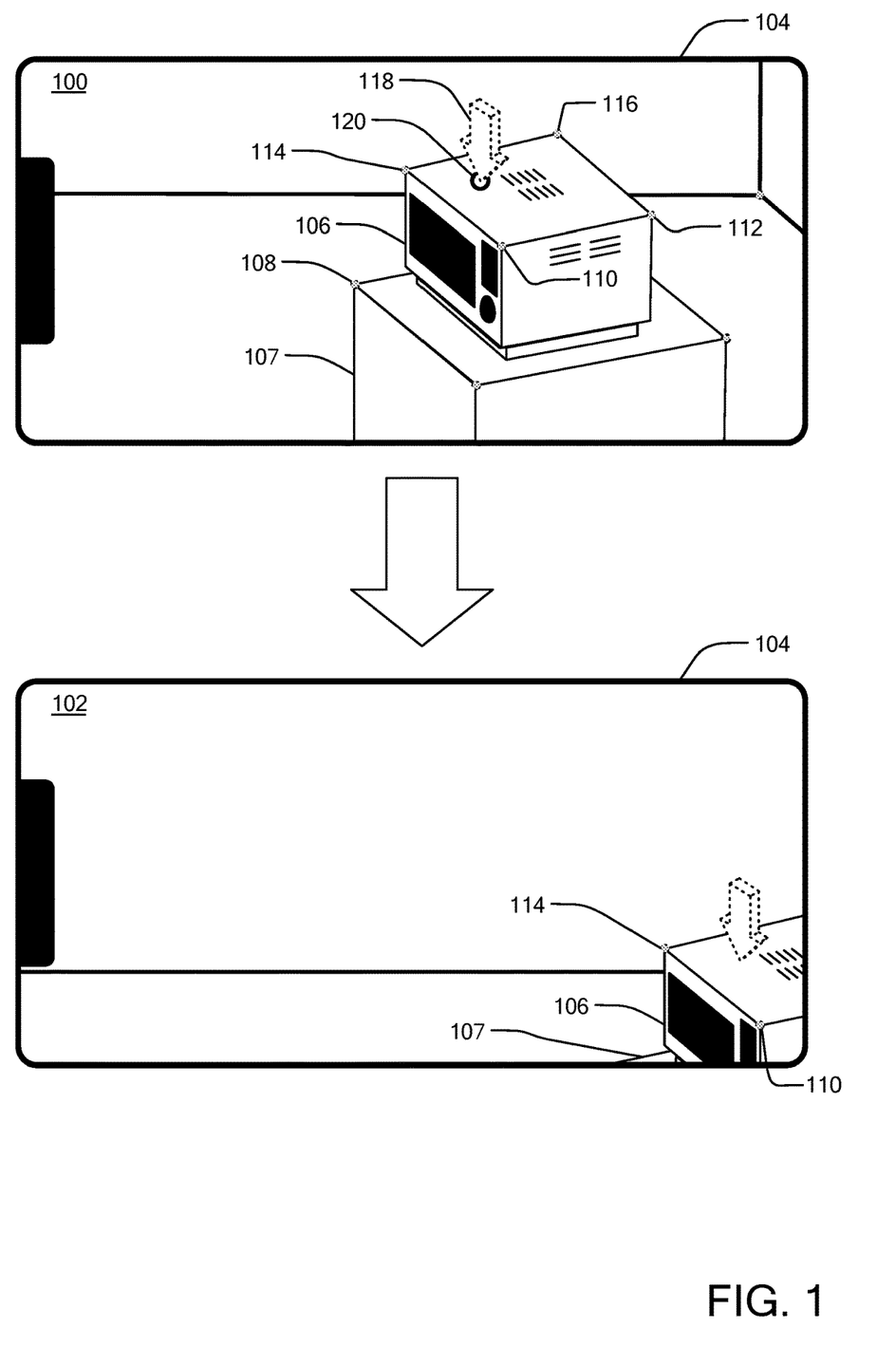
FIG. 1 illustrates example spatial registration between virtual and physical elements in a mixed reality environment in two different fields of view through a mobile phone.

FIG. 1 illustrates example spatial registration between virtual and physical elements in a mixed reality environment in two different fields of view 100 and 102 through a mobile phone 104. In the field of view 100, a user can view a microwave oven 106 and a podium 107 in a physical user space. In this implementation, the microwave oven 106 is captured by a front-facing video camera on the mobile phone 104. A video stream from the video camera includes a time-sequence of video frames, wherein each video frame is an image captured by the video camera at a particular time.

As the user moves the mobile phone 104 and its front-facing video camera, the field of view changes, as represented by the field of view 102. In the field of view 102, the camera has moved such that some of the microwave oven 106 and its podium 107 are now out of frame.

In support of the mixed reality environment, captured video frames of the physical user space are analyzed to identify image features. Those image features are then mapped into a virtual user space where they can interact with virtual elements in the mixed reality environment. For example, a user can place a virtual element in the form of an arrow annotation 118 into the field of view 100, positioned as though it is pointing at the top surface of the microwave oven 106.

To detect such image features, the mobile phone 104 receives and analyzes the time-sequence of video frames. In one implementation, an image processing engine executed by one or more hardware processors of the mobile phone 104 detects features points in the images provided by the video frames for use in spatial reconstruction. For example, in FIG. 1, the image processing engine analyzes the images and identifies image features (or components thereof) that can be classified as feature points. As part of the analysis, the image processing engine can measure the correspondence of like image features across multiple video frames as part of feature point detection. Example image features may include without limitation edges, corners, blobs, and ridges. From such image features, the image processing engine can identify various locations in the images as feature points, such as intersections of edges, intersections of ridges, and detected corners.

Some image processing engines can associate a confidence value with each feature point. Confidence can be measured by the image processing engine based on a variety of factors, including without limitation feature point stability/alignment from video frame to video frame in the virtual user space, other annotations, sharpness, and some factors that are described as possible components of selection criteria below.

Turning back to FIG. 1, the field of view 100 is marked with multiple example feature points (e.g., feature point 108, feature point 110, feature point 112, feature point 114, feature point 116, and others) detected by the image processing engine of the mobile phone 104. Many other detected feature points are not shown in FIG. 1, for simplicity. Such feature points are detected across multiple video frames captured by the camera.

Having detected multiple feature points of the physical user space in multiple video frames, the image processing engine maps the detected feature points into the virtual user space. The image processing engine then selects individual feature points according to selection criteria designed to map the image features of the physical user space accurately into the virtual user space. In one implementation, the selected feature points are used to define (e.g., spatially reconstruct) a triangle mesh of image features in the virtual user space. One or more triangles of the triangle mesh in the virtual user space can represent a surface in the physical user space. In the field of view 100, at least three of the feature points 110, 112, 113, and 116 can be used to define the feature surface corresponding to the top surface of the microwave oven 106. For this example, it is assumed that feature points 110, 114, and 116 were used to define the feature surface triangle corresponding to the top surface of the microwave oven 106.

When the user places the arrow annotation 118 on the top surface of the microwave oven 106, a virtual element manager defines a raycast element in the virtual user space. The raycast element is attributed with a raycast axis, which in this case points downward toward the top surface of the microwave. For example, the user can touch a finger in the field of view 100 and drag the finger straight up. A user interface manager detects this gesture as a request to add a raycast element at that position, with a vertically oriented raycast axis directed downward. The virtual element manager then defines the raycast element in the virtual user space, as described below, with an origin point 120 being mapped to the intersection of the top feature surface and the ray cast axis in the virtual user space.

The field of view 100 and the field of view 102 are captured in two different video frames. Feature point positioning and even detection can vary from video frame to video frame. The field of view 102 shows that some feature points of the microwave oven 106 are no longer in the video frame and, therefore, no longer in the image analyzed by the video processing engine. In particular, feature points 112 and 116 are no longer within the image corresponding to the field of view 102. As such, the feature point 116, which was used to define the triangle for the top surface of the microwave oven 106 is no longer available in the current frame. Loss of the previously-detected feature points 112 and 116 can cause the image processing engine to lose an accurate representation of the triangle corresponding to the top surface of the microwave oven 106. An inaccurate representation of the top feature surface can then cause the virtual element manager to be unable to accurately maintain the accuracy of the placement of the arrow annotation 118 at that surface. These inaccuracies may be perceived by the user as a loss of visual registration between the origin point 120 of the arrow annotation 118 and the top surface of the microwave oven 106 (e.g., the arrow annotation begins to wander around the field of view, providing an unnatural, non-intuitive experience).

The described technology can accommodate the loss of feature points in the current video frame by intelligently selecting feature points to spatially reconstruct the feature surface triangle with accuracy. Typically, each video frame includes many feature points, some providing more accurate spatial reconstruction than others. Furthermore, the current video frame may also lose the most accurate feature points (e.g., feature points 112 and 116). Accordingly, a feature point manager of the mobile phone 104 dynamically selects features points to obtain an accurate triangle mesh and, therefore, an accurate origin point 120 on the top surface feature at which to consistently position the arrow annotation 118 as the field of view continues to vary.

In one implementation, the feature point manager stores or buffers feature points from different video frames for use in spatially reconstructing feature surfaces. The buffer feature points are mapped into the virtual user space, so that each point's position in virtual user space is maintained even as the field of view of the physical user space varies. In this manner, the virtual element manager can select one or more feature points from previous frames to supplement or replace detected or missing feature points of the current frame when defining feature surfaces. As such, even though the feature points 112 and 116 are no longer available in the current video frame (of the field of view 102), the feature points 112 from a previous frame (of the field of view 100) can still be used. It should be understood that the selection criteria may use different feature points to define the top feature surface, including those that had not been used from previous video frames. The selection criteria may also include other considerations when selecting the available feature points used to spatially reconstruct a feature surface triangle, as described with respect to the subsequent figures.

Figure 2:
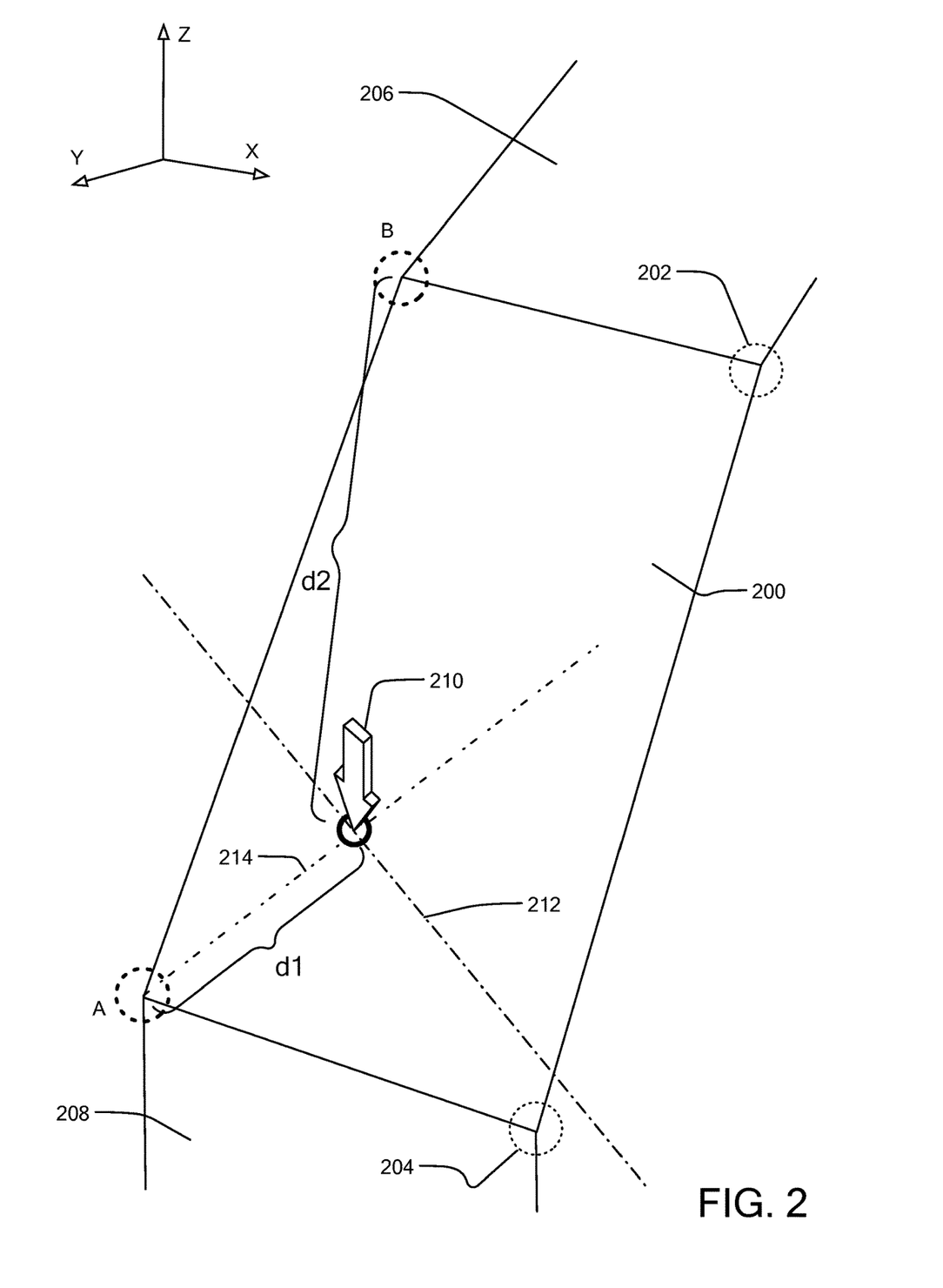
FIG. 2 illustrates example selection of two feature points for defining a feature surface in a virtual user space.

FIG. 2 illustrates example selection of two feature points A and B for defining a feature surface 200 in a virtual user space (represented by the X-Y-Z axes). Feature points A and B are among multiple feature points detected in the video frame illustrated in FIG. 2. Other feature points include feature point 202 and feature point 204. It should also be understood that other feature surfaces (e.g., feature surface 206 and 208) are also illustrated in FIG. 2, and they may be spatially reconstructed using these feature points or other detected feature points in the video frame and other video frames. The multiple feature points, including the one or more feature points from previous video frames, are mapped into virtual user space and stored (e.g., in a memory buffer) for use in spatially reconstructing feature surfaces in the virtual user space.

When a user interface manager detects addition of a raycast element in the field of view, a virtual element manager defines the raycast element with a directional axis in the virtual user space corresponding to the user's gesture in one or more video frames. A feature point manager selects at least three feature points from the multiple feature points based on selection criteria applied in the virtual user space along the raycast axis in the virtual user space.

In one implementation, a selection criterion prioritizes feature points in the virtual user space that are closest to the raycast axis. For example, given a raycast axis that is co-linear with an arrow annotation 210, the feature point A is first selected because it is closest to the raycast axis (at distance d1 from the raycast axis). Another criterion, applied to select the second feature point of the at least three feature points selected to define the feature surface in virtual space, identifies the closest feature point positioned on the "other side" of the raycast axis. In one implementation, the "other side" is defined by a line 212 that is defined as orthogonal to the raycast axis and to a line 214 connecting the raycast axis to the feature point A, and the closest feature point on the other side of that line 212 is the feature point B (at distance d2 from the raycast axis), which is closer to the raycast axis in the virtual user space than the feature point 202.

Figure 3:
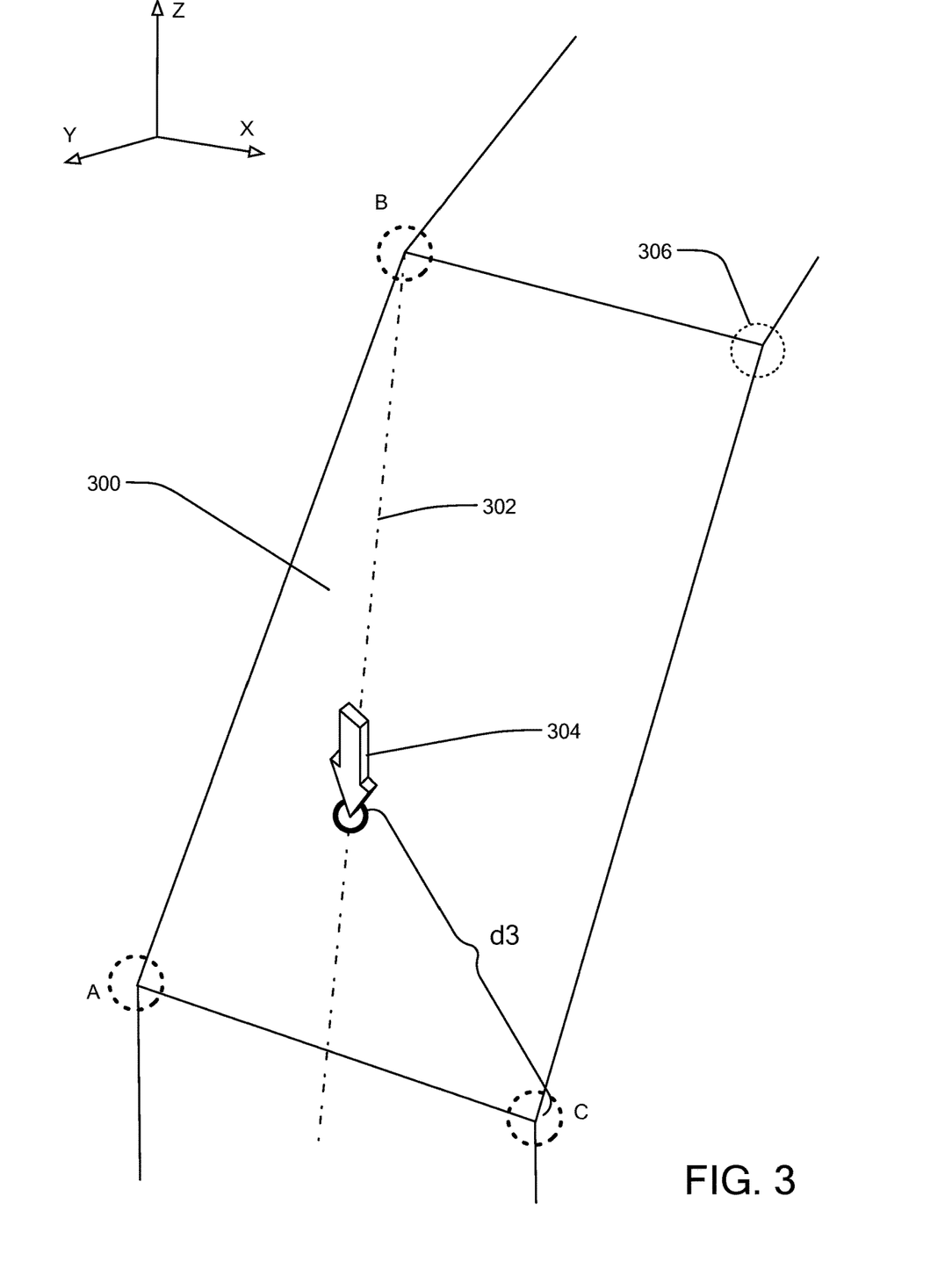
FIG. 3 illustrates example selection of a third feature point for defining a feature surface in a virtual user space.

FIG. 3 illustrates example selection of a third feature point (feature point C) for defining a feature surface 300 in a virtual user space (represented by the X-Y-Z axes). Having identified feature points A and B, the feature point manager selects a third feature point from the set of multiple detected feature points. The raycast axis is co-linear with an arrow annotation 304. Accordingly, a third criterion, applied to select the third feature point of the at least three feature points selected to define the feature surface in virtual space, identifies the closest feature point positioned on yet another "other side" of the raycast axis from the feature point A. In one implementation, this "other side" is defined by a line 302 connecting the raycast axis to the feature point B in the virtual user space, and the closest feature point on this other side of the line 302 is the feature point C (at distance d3 from the raycast axis), which is closer to the raycast axis in the virtual user space than the feature point 306.

Figure 4:
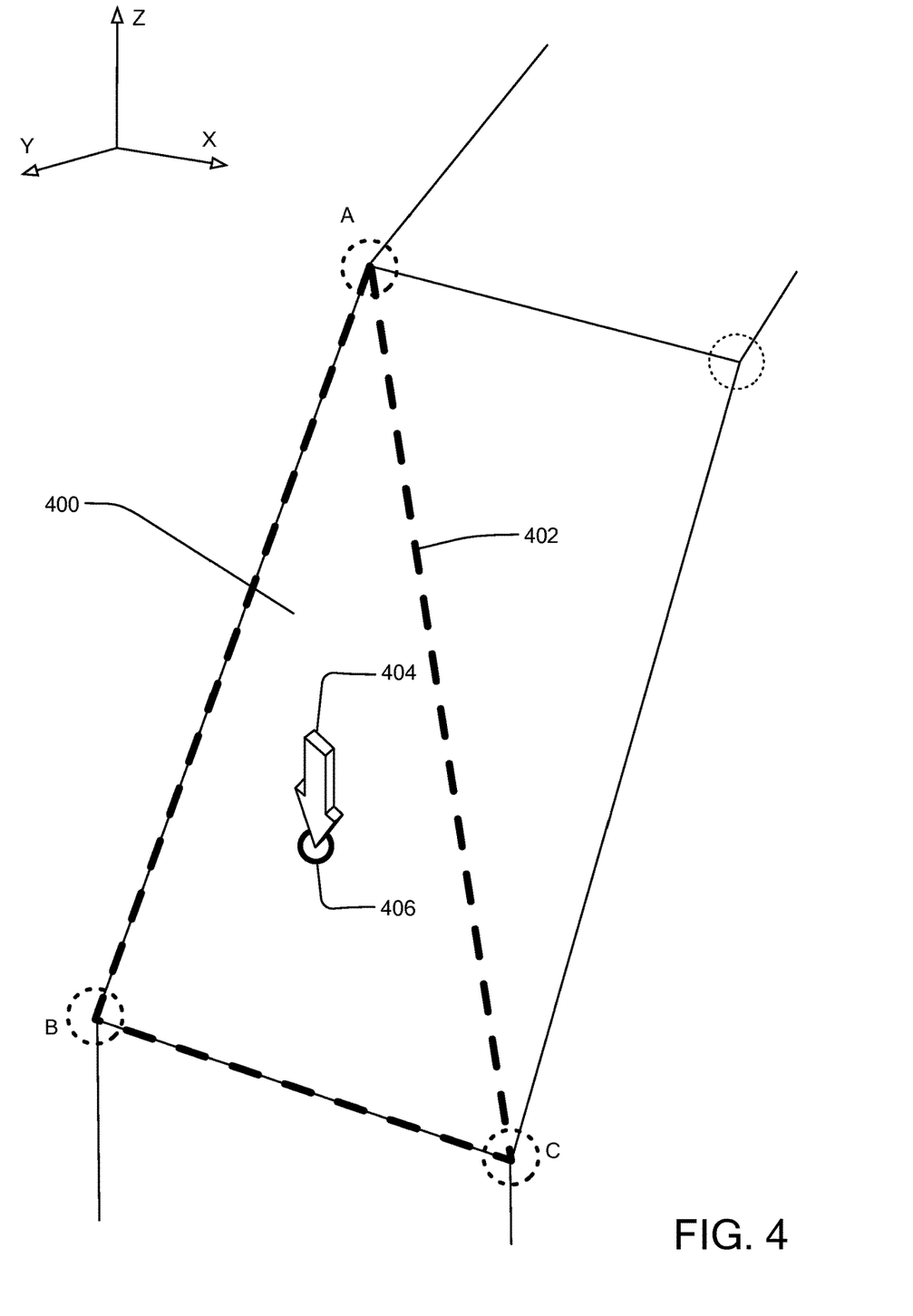
FIG. 4 illustrates an example definition of a feature surface in a virtual user space.

FIG. 4 illustrates an example definition of a feature surface 400 in a virtual user space (represented by the X-Y-Z axes). With the feature point selector having selected at least three feature points A, B, and C, a feature surface manager defines a triangle 402 for the triangle mesh using the three feature points A, B, and C. The raycast axis is co-linear with an arrow annotation 404.

It should be understood that any of the selected feature points used to define the triangle may be selected from the buffer memory, which includes feature points mapped from multiple video frames. Accordingly, if the current video frame does not have the feature points that best match the selection criteria, the feature point manager can select feature points corresponding to previous video frames. Furthermore, other feature surface triangles can be defined using one or more of these selected feature points or other buffered feature points.

A graphics display in the mobile phone renders an arrow annotation 404 at the origin point 406 positioned in the virtual user space at the intersection of the raycast axis and the feature surface defined by the feature surface triangle. As the field of view changes, the feature point manager continues to select feature points that satisfy (e.g., best satisfy, sufficiently satisfy) the selection criteria from the buffered feature points in the virtual user space, and the graphics display continues to render the arrow annotation 404 at the consistent origin point 406 in the virtual user space.

Other selection criteria are listed below with respect to FIG. 6.

Figure 5:
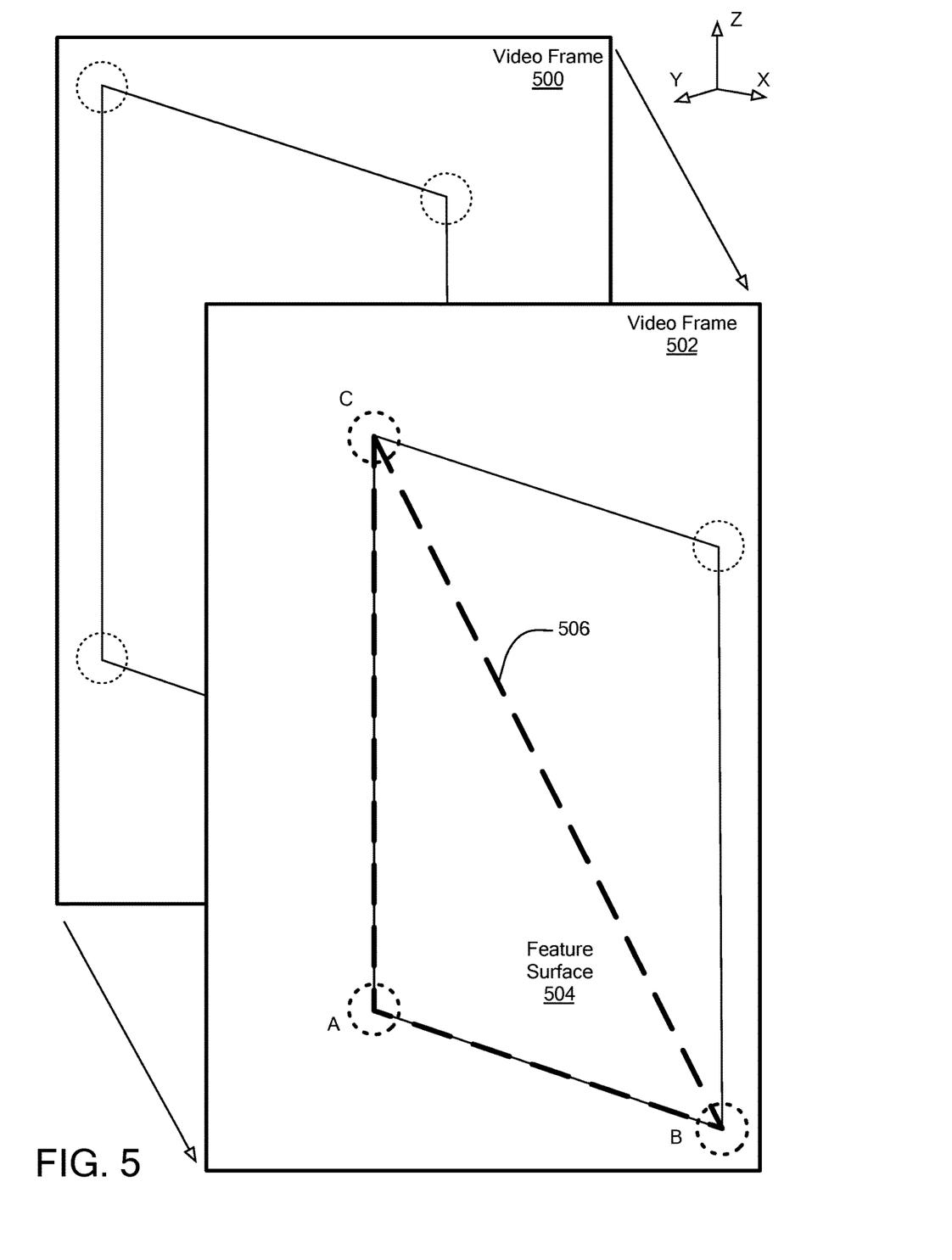
FIG. 5 illustrates two video frames that include a feature surface, wherein the feature points selected to define the feature surface reside in the same video frame.

FIG. 5 illustrates two video frames 500 and 502 that include a feature surface 504, wherein the feature points selected to define the feature surface 504 reside in the same video frame. The video frame 500 precedes the video frame 502 in the time sequence of video frames—the video frame 502 is the most recent frame. The feature surface 504 appears in both video frames, as do the same four feature points, albeit at different times. The field of view in each video frame is shifted, such that the position of the feature surface is different in each frame. Nevertheless, the feature points detected in both video frames are mapped into virtual user space (represented by the X-Y-Z axes) and stored in buffer memory. In FIG. 5, the feature point manager has selected the feature points A, B, and C in the virtual user space from the memory buffer of feature points from multiple video frames as the feature points to define the triangle 506 corresponding to the feature surface 504 in the virtual user space.

Figure 6:
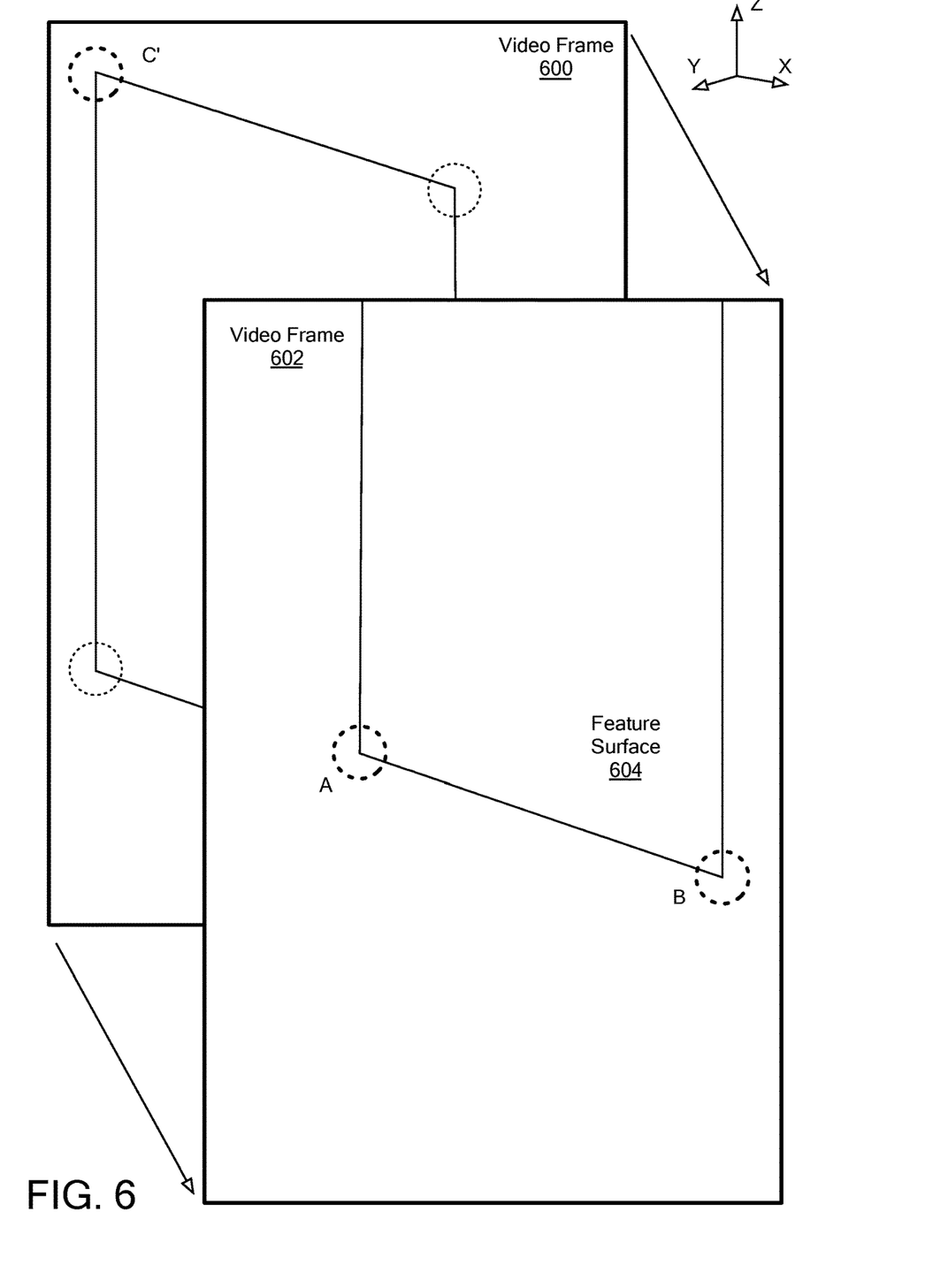
FIG. 6 illustrates two video frames that include a feature surface, wherein the feature points selected to define the feature surface reside in two different video frames.

FIG. 6 illustrates two video frames 600 and 602 that include a feature surface 604, wherein the feature points are selected to define the feature surface 604 reside in two different video frames. The video frame 600 precedes the video frame 602 in the time sequence of video frames—the video frame 602 is the most recent frame ("most recent" being an example recency threshold.) The feature surface 604 appears in both video frames; however, two of the feature points detected in the video frame 600 are not present in the video frame 602. The field of view in each video frame is shifted, such that the position of the feature surface is different in each frame. Nevertheless, the feature points detected in both video frames are mapped into virtual user space (represented by the X-Y-Z axes) and stored in buffer memory.

In FIG. 6, the feature point manager has selected the feature points A, B, and C' in the virtual user space from the memory buffer of feature points from multiple video frames as the feature points to define the triangle 606 corresponding to the feature surface 604 in the virtual user space. (Although the feature point C' in the video frame 600 appears to be shifted relative to the feature surface 604 of the video frame 602, the mapping of all of the feature points into the virtual user space tends to align corresponding feature points from different video frames. As such, the feature surface manager defines the feature surface 604 using the feature points A, B, and C' in the virtual user space results in substantially the same triangle 606 in the virtual user space as shown in FIG. 5.

It should be understood that feature points need not be missing from a more recent frame in order for the feature point manager to select different feature points. In one implementation, feature point selection is based on selection criteria, which can include many individual selection conditions that can be applied in various combinations and priorities. Examples of individual selection conditions are listed below, without limitation, and not all of these selection conditions must be applied for any particular feature surface.

feature points that are closest to the raycast axis favored feature points that are closest to the raycast axis on the other side of the raycast axis from a previously-selected feature point more recently detected feature points are favored over less recently detected feature points (another example recency threshold, which is based on the relative detection recency of different feature points)

feature points that are that are spaced farther apart are more favored over feature points that are closer together feature points that are closer to the camera are favored over feature points that are farther away from the camera feature points that are within a distance range ("not too close, not too far") from the camera are favored over feature points that outside of that distance range feature points associated with higher confidence values than others, as received from an image processing engine The feature points stored in the buffer memory can be processed to manage resources, such as by purging stale feature points (e.g., stale feature points are older than a few video frames), cumulative features points or feature points that are too close (e.g., there is little value in a large number of feature points that map to the same or nearly the same point in the virtual user space), etc. Such processing can reduce memory consumption and improve spatial reconstruction performance (fewer feature points to process per operation).

Figure 7:
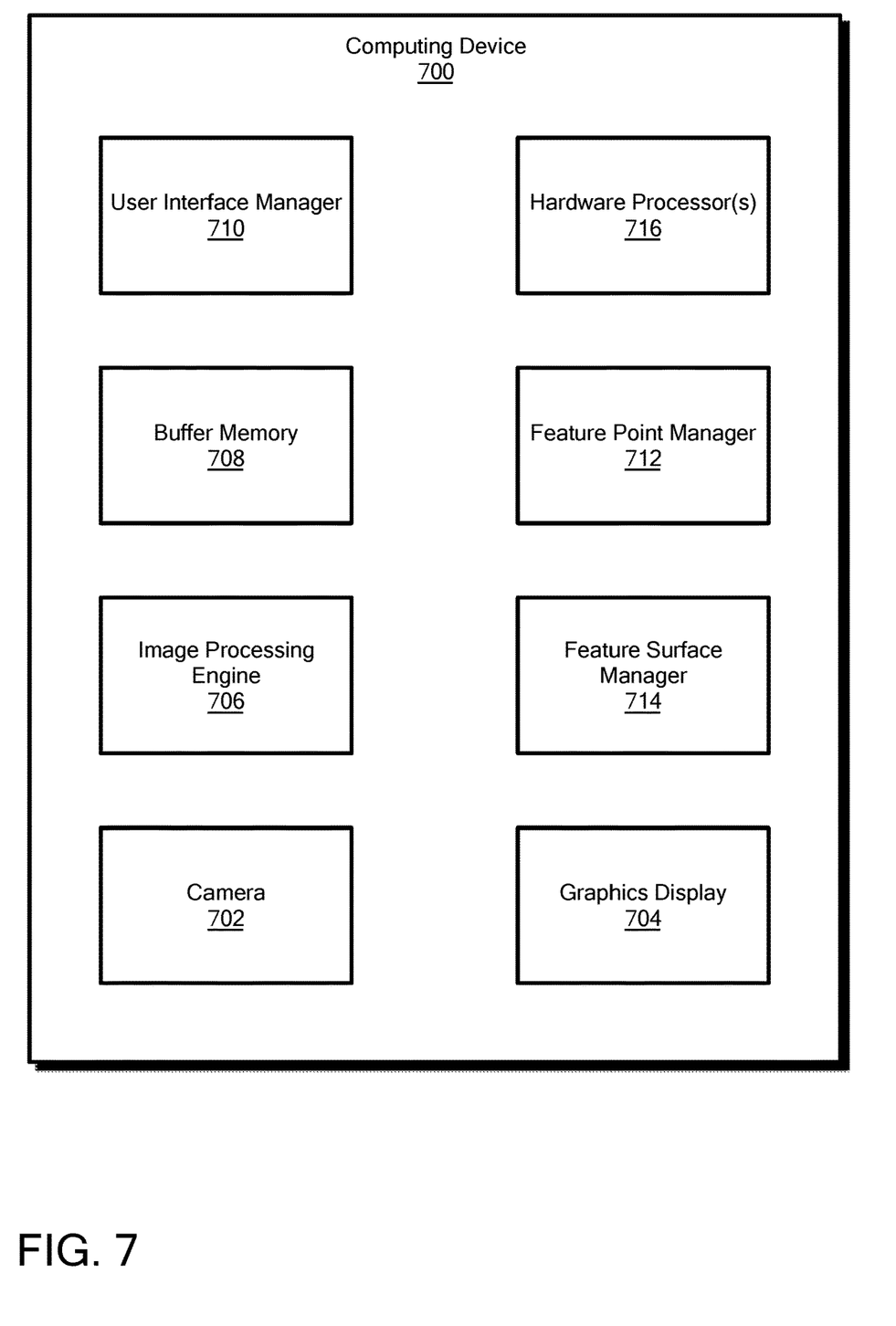
FIG. 7 illustrates example components of a computing device providing data selection for spatial reconstruction in a virtual user space.

FIG. 7 illustrates example components of a computing device 700 providing data selection for spatial reconstruction in a virtual user space. The computing device 700 is equipped with a camera 702, which can include multiple light sources and light sensors. The camera 702 may include one or more of an RGB light source and camera component and a depth camera component with an infrared (or other) light source. The computing device 700 is also equipped with a graphics display 704 that is configured to render virtual elements and physical elements in a mixed reality environment. The computing device 700 may also be communicatively connected to external cameras and/or graphics displays (not shown).

An image processing engine 706 receives a time sequence of video frames from the camera 702 and detects zero or more feature points from each video frame. In some implementations, the image processing engine 706 can also generate confidence values for one or more of the detected feature points. The image processing engine 706 maps each feature point into the virtual user space. The mapped feature points are stored in a buffer memory 708.

A user interface manager 710 manages a user interface of the computing device, such as a user interface sending and receiving data to and from the graphics display 704. The user interface manager 710 monitors user inputs, such through a touch screen, to detect addition of an annotation to the virtual user space. For example, the user can place a finger at a point on the touch screen and drag the finger in a direction away from that point. The user interface manager 710 can interpret this gesture as adding a raycast element to the virtual user space, wherein the raycast element corresponds to an arrow annotation.

A feature point manager 712 selects at least three points from the multiple feature points stored in the buffer memory 708. This selection is based on selection criteria defined to accurately define surface features in a virtual user space. In one implementation, at least three feature points stored in the buffer memory 708 that satisfy the selection criteria are selected for use in defining a surface feature. In one implementation, at least two of the selected feature points are from different video frames captured by the camera 702. A feature surface manager 714 defines the virtual feature surface in the virtual user space using the selected feature points.

The image processing engine 706, the user interface manager 710, the feature point manager 712, and the feature surface manager 714 are executed by one or more hardware processors 716.

Figure 8:
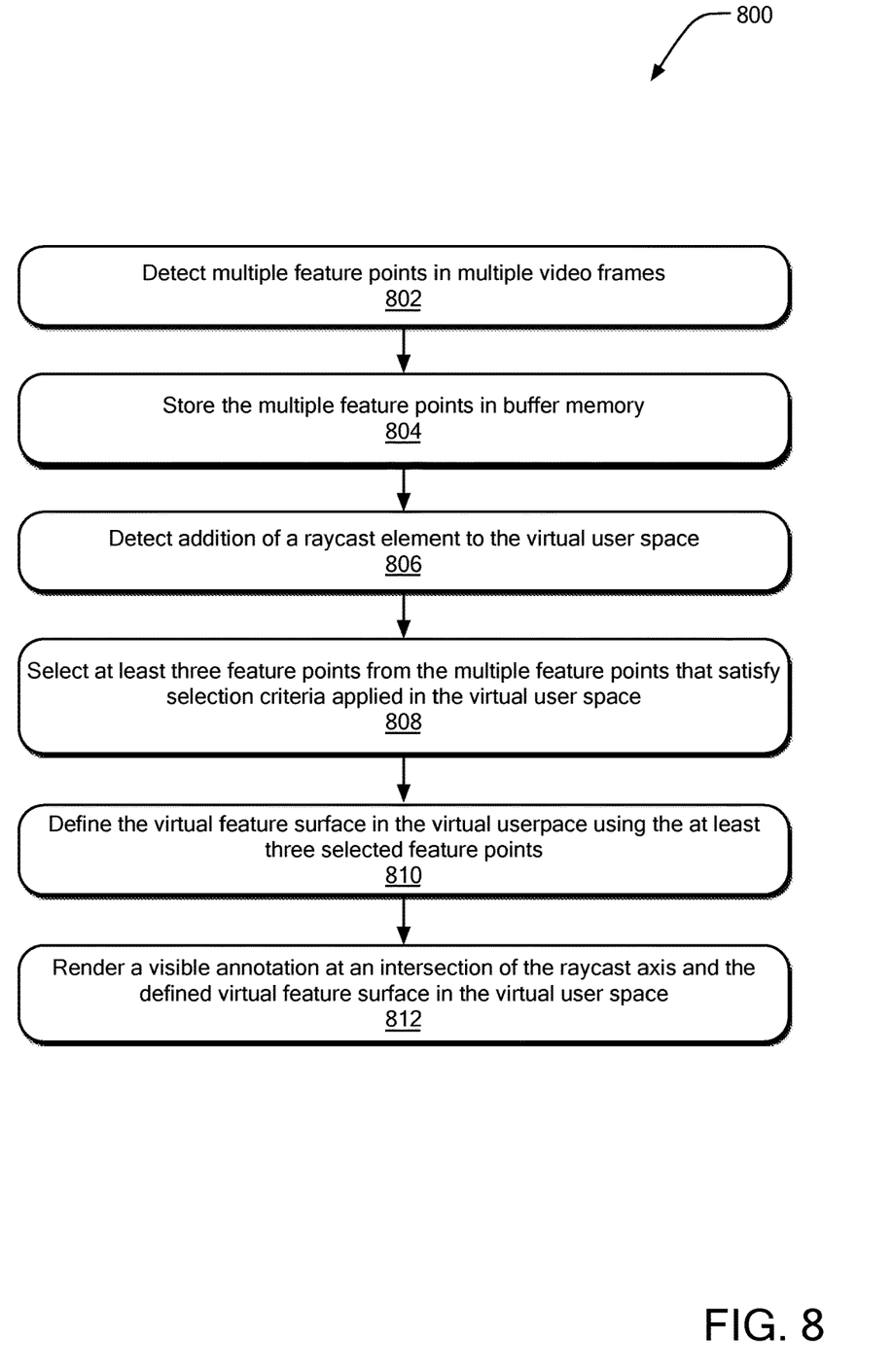
FIG. 8 illustrates example operations for selecting data for spatial reconstruction in a virtual user space.

FIG. 8 illustrates example operations 800 for selecting data for spatial reconstruction in a virtual user space. A detecting operation 802 detects multiple feature points in multiple video frames of a physical user space. A buffering operation 804 stores the multiple feature points in a buffer memory. Another detecting operation 806 detects addition of a raycast element in the virtual user space.

Responsive to detection of the addition of the raycast element in the virtual user space, a selection operation 808 selects at least three feature points from the buffered feature points that satisfy selection criteria applied in the virtual user space along a raycast axis of the raycast element. A definition operation 810 defines the virtual feature surface in the virtual user space using the at least three selected feature points. A display operation 812 renders a visible annotation at an intersection of the raycast axis and the defined virtual feature surface in the virtual user space.

Figure 9:
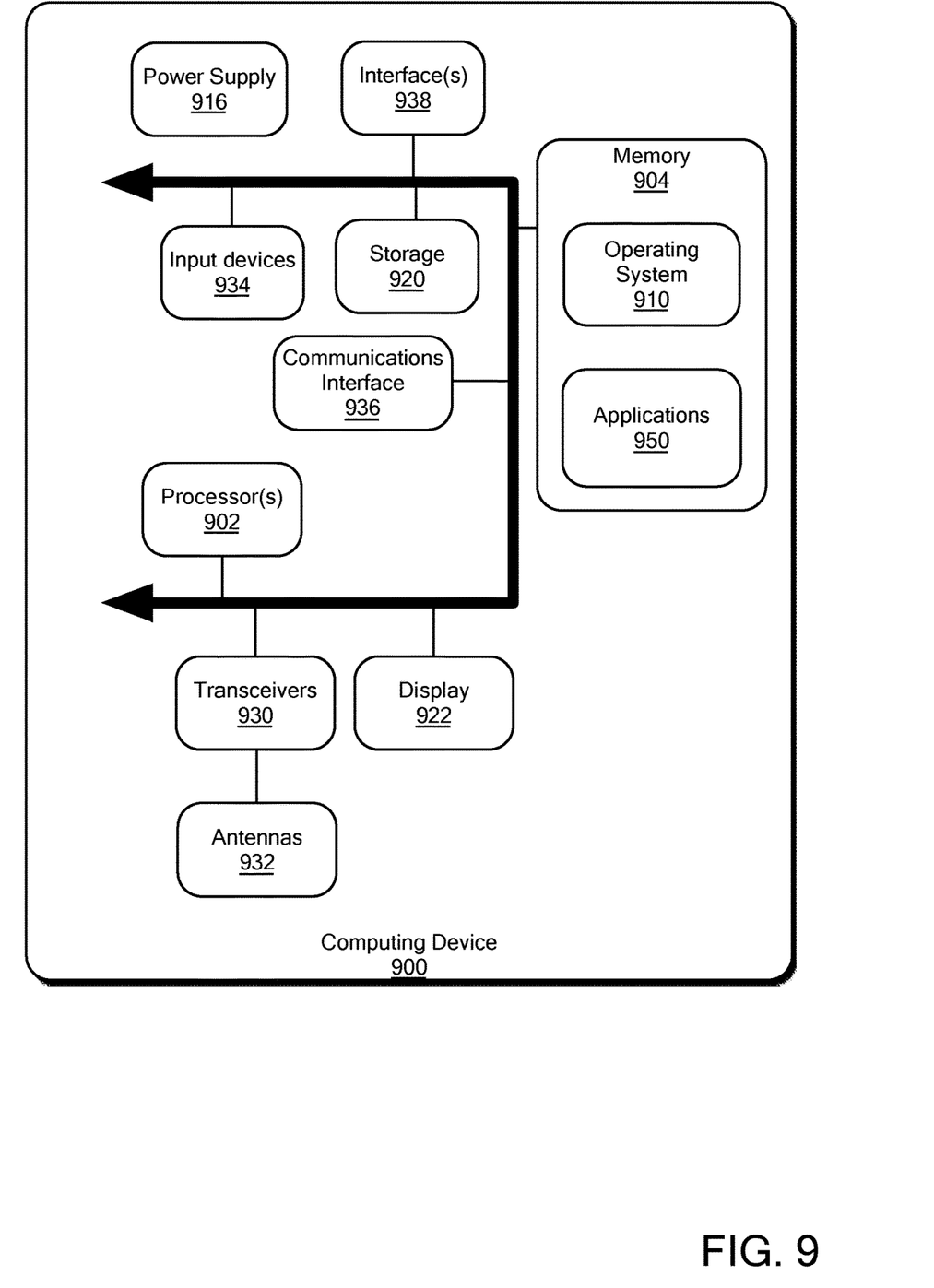
FIG. 9 illustrates exampled hardware and software that can be useful in implementing the described technology.

FIG. 9 illustrates exampled hardware and software that can be useful in implementing the described technology. The computing device 900 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 900 includes one or more processor(s) 902 and a memory 904. The memory 904 generally includes both volatile memory (e.g., RAM) and nonvolatile memory (e.g., flash memory). An operating system 910 resides in the memory 904 and is executed by the processor(s) 902.

In an example computing device 900, as shown in FIG. 9, one or more modules or segments, such as applications 950, an image processing engine, a user interface manager, a feature point manager, a feature surface manager, a 3D mapping subsystem, and other services and modules, are loaded into the operating system 910 on the memory 904 and/or storage 920 and executed by processor(s) 902. The storage 920 may include one or more tangible storage media devices and may store confidence parameters, feature points, feature surfaces, triangle meshes, raycast elements, and other data and be local to the computing device 900 or may be remote and communicatively connected to the computing device 900.

The computing device 900 includes a power supply 916, which is powered by one or more batteries or other power sources and which provides power to other components of the computing device 900. The power supply 916 may also be connected to an external power source that overrides or recharges the built-in batteries or other power sources.

The computing device 900 may include one or more communication transceivers 930 which may be connected to one or more antenna(s) 932 to provide network connectivity (e.g., mobile phone network, Wi-Fi®, Bluetooth®) to one or more other servers and/or client devices (e.g., mobile devices, desktop computers, or laptop computers). The computing device 900 may further include a network adapter 936, which is a type of computing device. The computing device 900 may use the adapter and any other types of computing devices for establishing connections over a wide-area network (WAN) or local-area network (LAN). It should be appreciated that the network connections shown are exemplary and that other computing devices and means for establishing a communications link between the computing device 900 and other devices may be used.

The computing device 900 may include one or more input devices 934 such that a user may enter commands and information (e.g., a keyboard or mouse). These and other input devices may be coupled to the server by one or more interfaces 938, such as a serial port interface, parallel port, or universal serial bus (USB). The computing device 900 may further include a display 922, such as a touch screen display.

The computing device 900 may include a variety of tangible processor-readable storage media and intangible processor-readable communication signals. Tangible processor-readable storage can be embodied by any available media that can be accessed by the computing device 900 and includes both volatile and nonvolatile storage media, removable and non-removable storage media. Tangible processor-readable storage media excludes communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a computing device 900 implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server computing devices.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

An example method of spatially reconstructing a virtual feature surface in a mixed reality environment includes detecting addition of a raycast element to a virtual user space, mapping multiple feature points detected from multiple video frames of a physical user space into the virtual user space, and selecting at least three feature points from the multiple feature points that satisfy selection criteria applied in the virtual user space along a raycast axis of the raycast element in the virtual user space. At least two of the at least three feature points are detected in different video frames. The method further defines the virtual feature surface in the virtual user space using the at least three selected feature points.

Another example method of any preceding method is provided, wherein the method further includes rending a visible annotation at an intersection of the raycast axis and the defined virtual feature surface in the virtual user space.

Another example method of any preceding method is provided, wherein the multiple video frames correspond to different times in a video stream.

Another example method of any preceding method is provided, wherein the selection criteria include favoring feature points positioned closer to the raycast axis in the virtual user space than other features points of the multiple feature points.

Another example method of any preceding method is provided, wherein the selection criteria include disfavoring feature points positioned closer than a proximity threshold distance from other selected feature points of the multiple feature points.

Another example method of any preceding method is provided, wherein the raycast element is defined based on a position of a physical camera in the mixed reality environment, and the selection criteria include disfavoring feature points positioned farther than a threshold distance from the position of the physical camera.

Another example method of any preceding method is provided, wherein the selection criteria include disfavoring feature points that are older than a recency threshold than other selected feature points of the multiple feature points.

An example system for spatially reconstructing a virtual feature surface in a mixed reality environment is provided. The system includes one or more hardware processors, a user interface manager executed by the one or more hardware processors and configured to detect addition of a raycast element to a virtual user space, an image processing engine executed by the one or more hardware processors and configured to map multiple feature points detected from multiple video frames of a physical user space into the virtual user space, and a feature point manager executed by the one or more hardware processors and configured to select at least three feature points from the multiple feature points that satisfy selection criteria applied in the virtual user space along a raycast axis of the raycast element in the virtual user space. At least two of the at least three feature points are detected in different video frames. A feature surface manager is executed by the one or more hardware processors and configured to define the virtual feature surface in the virtual user space using the at least three selected feature points.

Another example system of any preceding system is provided, wherein the system further includes a graphics display configured to render a visible annotation at an intersection of the raycast axis and the defined virtual feature surface in the virtual user space.

Another example system of any preceding system is provided, wherein the multiple video frames correspond to different times in a video stream.

Another example system of any preceding system is provided, wherein the selection criteria include favoring feature points positioned closer to the raycast axis in the virtual user space than other features points of the multiple feature points.

Another example system of any preceding system is provided, wherein the selection criteria include disfavoring feature points positioned closer than a proximity threshold distance from other selected feature points of the multiple feature points.

Another example system of any preceding system is provided, wherein the raycast element is defined based on a position of a physical camera in the mixed reality environment, and the selection criteria include disfavoring feature points positioned farther than a threshold distance from the position of the physical camera.

Another example system of any preceding system is provided, wherein the selection criteria include disfavoring feature points that are older than a recency threshold than other selected feature points of the multiple feature points.

One or more example tangible processor-readable storage media of a tangible article of manufacture encoding processor-executable instructions for executing on an electronic computing device a process of spatially reconstructing a virtual feature surface in a mixed reality environment are provided. The process includes detecting addition of a raycast element to a virtual user space, mapping multiple feature points detected from multiple video frames of a physical user space into the virtual user space, and selecting at least three feature points from the multiple feature points that satisfy selection criteria applied in the virtual user space along a raycast axis of the raycast element in the virtual user space. At least two of the at least three feature points being detected in different video frames. The process further includes defining the virtual feature surface in the virtual user space using the at least three selected feature points.

Other one or more example tangible processor-readable storage media of any preceding media is provided, wherein the process further includes rendering a visible annotation at an intersection of the raycast axis and the defined virtual feature surface in the virtual user space.

Other one or more example tangible processor-readable storage media of any preceding media is provided, wherein the selection criteria include favoring feature points positioned closer to the raycast axis in the virtual user space than other features points of the multiple feature points.

Other one or more example tangible processor-readable storage media of any preceding media is provided, wherein the selection criteria include disfavoring feature points positioned closer than a proximity threshold distance from other selected feature points of the multiple feature points.

Other one or more example tangible processor-readable storage media of any preceding media is provided, wherein the raycast element is defined based on a position of a physical camera in the mixed reality environment, and the selection criteria include disfavoring feature points positioned farther than a threshold distance from the position of the physical camera.

Other one or more example tangible processor-readable storage media of any preceding media is provided, wherein the selection criteria include disfavoring feature points that are older than a recency threshold than other selected feature points of the multiple feature points.

An example system for spatially reconstructing a virtual feature surface in a mixed reality environment includes means for detecting addition of a raycast element to a virtual user space, means for mapping multiple feature points detected from multiple video frames of a physical user space into the virtual user space, and means for selecting at least three feature points from the multiple feature points that satisfy selection criteria applied in the virtual user space along a raycast axis of the raycast element in the virtual user space. At least two of the at least three feature points are detected in different video frames. The system further includes means for defining the virtual feature surface in the virtual user space using the at least three selected feature points.

Another example system of any preceding system is provided, wherein the system further includes means for rending a visible annotation at an intersection of the raycast axis and the defined virtual feature surface in the virtual user space.

Another example system of any preceding system is provided, wherein the multiple video frames correspond to different times in a video stream.

Another example system of any preceding system is provided, wherein the selection criteria favors feature points positioned closer to the raycast axis in the virtual user space than other features points of the multiple feature points.

Another example system of any preceding system is provided, wherein the selection criteria disfavors feature points positioned closer than a proximity threshold distance from other selected feature points of the multiple feature points.

Another example system of any preceding system is provided, wherein the raycast element is defined based on a position of a physical camera in the mixed reality environment, and the selection criteria disfavors feature points positioned farther than a threshold distance from the position of the physical camera.

Another example system of any preceding system is provided, wherein the selection criteria disfavors feature points that are older than a recency threshold than other selected feature points of the multiple feature points.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of spatially reconstructing a virtual feature surface in a mixed reality environment, the method comprising:
   detecting addition of a raycast element to a virtual user space;
   mapping multiple feature points detected from multiple video frames of a physical user space into the virtual user space;
   selecting at least three feature points from the multiple feature points that satisfy selection criteria applied in the virtual user space along a raycast axis of the raycast element in the virtual user space, at least two of the at least three feature points being detected in different video frames; and
   defining the virtual feature surface in the virtual user space using the at least three selected feature points.

2. The method of claim 1, further comprising:
   rendering a visible annotation at an intersection of the raycast axis and the defined virtual feature surface in the virtual user space.

3. The method of claim 1, wherein the multiple video frames correspond to different times in a video stream.

4. The method of claim 1, wherein the selection criteria include favoring feature points positioned closer to the raycast axis in the virtual user space than other features points of the multiple feature points.

5. The method of claim 1, wherein the selection criteria include disfavoring feature points positioned closer than a proximity threshold distance from other selected feature points of the multiple feature points.

6. The method of claim 1, wherein the raycast element is defined based on a position of a physical camera in the mixed reality environment, and the selection criteria include disfavoring feature points positioned farther than a threshold distance from the position of the physical camera.

7. The method of claim 1, wherein the selection criteria include disfavoring feature points that are older than a recency threshold than other selected feature points of the multiple feature points.

8. A system for spatially reconstructing a virtual feature surface in a mixed reality environment, the system comprising:
   one or more hardware processors;
   a user interface manager executed by the one or more hardware processors and configured to detect addition of a raycast element to a virtual user space;
   an image processing engine executed by the one or more hardware processors and configured to map multiple feature points detected from multiple video frames of a physical user space into the virtual user space;
   a feature point manager executed by the one or more hardware processors and configured to select at least three feature points from the multiple feature points that satisfy selection criteria applied in the virtual user space along a raycast axis of the raycast element in the virtual user space, at least two of the at least three feature points being detected in different video frames; and
   a feature surface manager executed by the one or more hardware processors and configured to define the virtual feature surface in the virtual user space using the at least three selected feature points.

9. The system of claim 8, further comprising:
   a graphics display configured to render a visible annotation at an intersection of the raycast axis and the defined virtual feature surface in the virtual user space.

10. The system of claim 8, wherein the multiple video frames correspond to different times in a video stream.

11. The system of claim 8, wherein the selection criteria include favoring feature points positioned closer to the raycast axis in the virtual user space than other features points of the multiple feature points.

12. The system of claim 8, wherein the selection criteria include disfavoring feature points positioned closer than a proximity threshold distance from other selected feature points of the multiple feature points.

13. The system of claim 8, wherein the raycast element is defined based on a position of a physical camera in the mixed reality environment, and the selection criteria include disfavoring feature points positioned farther than a threshold distance from the position of the physical camera.

14. The system of claim 8, wherein the selection criteria include disfavoring feature points that are older than a recency threshold than other selected feature points of the multiple feature points.

15. One or more tangible processor-readable storage media of a tangible article of manufacture encoding processor-executable instructions for executing on an electronic computing device a process of spatially reconstructing a virtual feature surface in a mixed reality environment, the process comprising:
   detecting addition of a raycast element to a virtual user space;
   mapping multiple feature points detected from multiple video frames of a physical user space into the virtual user space;
   selecting at least three feature points from the multiple feature points that satisfy selection criteria applied in the virtual user space along a raycast axis of the raycast element in the virtual user space, at least two of the at least three feature points being detected in different video frames; and
   defining the virtual feature surface in the virtual user space using the at least three selected feature points.

16. The one or more tangible processor-readable storage media of claim 15, further comprising:
   rendering a visible annotation at an intersection of the raycast axis and the defined virtual feature surface in the virtual user space.

17. The one or more tangible processor-readable storage media of claim 15, wherein the selection criteria include favoring feature points positioned closer to the raycast axis in the virtual user space than other features points of the multiple feature points.

18. The one or more tangible processor-readable storage media of claim 15, wherein the selection criteria include disfavoring feature points positioned closer than a proximity threshold distance from other selected feature points of the multiple feature points.

19. The one or more tangible processor-readable storage media of claim 15, wherein the raycast element is defined based on a position of a physical camera in the mixed reality environment, and the selection criteria include disfavoring feature points positioned farther than a threshold distance from the position of the physical camera.

20. The one or more tangible processor-readable storage media of claim 15, wherein the selection criteria include disfavoring feature points that are older than a recency threshold than other selected feature points of the multiple feature points.

\* \* \* \* \*